E. BORGESSON.
ATTACHMENT FOR DRAGS.
APPLICATION FILED FEB. 11, 1919.
1,329,953.
Patented Feb. 3, 1920.
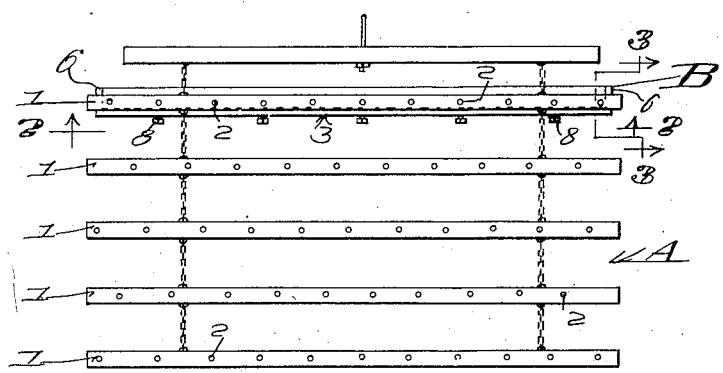
Fig. 1.
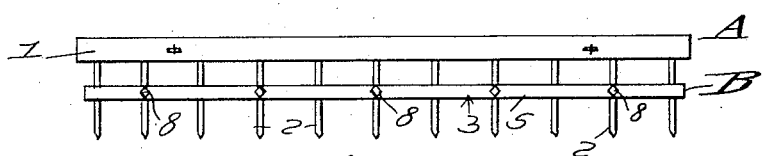
Fig. 2.
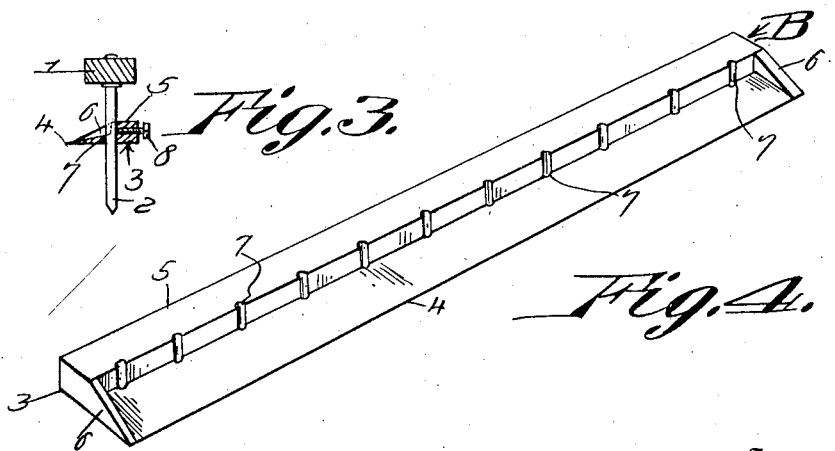
Fig. 3.
Fig. 4.
Inventor
Emil Borgesson,
By
Attorney

UNITED STATES PATENT OFFICE.

EMIL BORGESSON, OF WASHTA, IOWA.

ATTACHMENT FOR DRAGS.

1,329,953.  Specification of Letters Patent.  Patented Feb. 3, 1920.

Application filed February 11, 1919. Serial No. 276,117.

*To all whom it may concern:*

Be it known that I, EMIL BORGESSON, a citizen of the United States of America, residing at Washta, in the county of Cherokee and State of Iowa, have invented new and useful Improvements in Attachments for Drags, of which the following is a specification.

The object of the invention is to provide a knife attachment for toothed drags, so that when the ground is loosened by the drags, the knife may break up the ground and cut weeds and the like that may be encountered. The knife or knives, if more than one are used, are detachable and may be regulated to stand either high or low with reference to the teeth of the drag. Thus the depth to which they, the knives, penetrate the ground may be regulated.

The invention is shown and described in a specific embodiment to which, however, it is not to be restricted. The right is reserved to make such changes or alterations as the actual reduction to practice may suggest, in so far as such changes or alterations are compatible in spirit with the annexed claims.

In the accompanying drawings:

Figure 1 is a top plan view of a drag showing the invention applied thereto.

Fig. 2 is a section on the line 2—2 of Fig. 1.

Fig. 3 is a section on the line 3—3 of Fig. 1.

Fig. 4 is a perspective view of the knife comprising the invention.

Referring to the drawings, there is shown an ordinary drag A formed with the transverse bars 1 from which depend the teeth 2. The invention comprises a knife or plate B which is attachable to the drag by being secured to the teeth. The knife comprises a body portion 3 formed with a cutting edge 4 and with the longitudinal upstanding flange 5 on the edge opposite the cutting edge, the ends of the knife having the flange portions 6 which connect with the flange 5 and taper in thickness toward the edge 4 at which they terminate. The body portion 3 is formed with a plurality of holes 7 through which teeth 2 pass and the flange 5 and the body portion is drilled opposite certain of these holes in order that said screws 8 may be employed for seating against certain of the teeth 2 to secure the knife to the teeth when the latter are inserted through the holes 7.

It will be observed that the knife can be raised and lowered on the teeth so that its penetration in the ground may thus be regulated and it may be readily detached from the teeth when it is desired to sharpen same or effect repairs thereon.

It may be further convenient to use a knife on the teeth carried by each beam or to use only a single knife both plans being contemplated by the invention.

From the foregoing description and the accompanying drawings, it is believed that a clear enough understanding of the invention is to be had to render further description unnecessary.

The invention having been described, what is claimed as new and useful is:

1. The combination with a drag having cross beams and teeth depending therefrom, of a knife formed with a plurality of perforations through which the teeth pass, and means for securing the knife on the teeth whereby it may be raised or lowered relative thereto.

2. The combination with a drag having cross beams and teeth depending therefrom, of a knife formed with a plurality of perforations through each one of which one of the teeth passes, the knife being formed with a cutting edge and a flange portion opposite the cutting edge, the flange portion and the knife being drilled and tapped opposite certain perforations, and set screws carried in the drill holes and bearing upon the teeth in the manner and for the useful purpose specified.

In testimony whereof I affix my signature.

EMIL BORGESSON.